United States Patent
Higo et al.

(10) Patent No.: US 6,495,110 B1
(45) Date of Patent: Dec. 17, 2002

(54) SUPERCRITICAL REACTION APPARATUS AND METHOD

(75) Inventors: Tsutomu Higo, Tokyo (JP); Massahiro Roberto Serikawa, Fujisawa (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/403,501

(22) PCT Filed: Apr. 22, 1998

(86) PCT No.: PCT/JP98/01846

§ 371 (c)(1),
(2), (4) Date: Oct. 22, 1999

(87) PCT Pub. No.: WO98/47612

PCT Pub. Date: Oct. 29, 1998

(30) Foreign Application Priority Data

Apr. 23, 1997 (JP) .............................................. 9-120267

(51) Int. Cl.⁷ ................................................. F28D 7/00
(52) U.S. Cl. ........................ 422/201; 422/203; 422/200
(58) Field of Search ........................... 423/659; 422/200, 422/201, 203

(56) References Cited

U.S. PATENT DOCUMENTS

| | | |
|---|---|---|
| 4,543,190 A | 9/1985 | Modell |
| 4,822,497 A | 4/1989 | Hong et al. |
| 5,252,224 A | 10/1993 | Modell et al. |
| 5,358,646 A * | 10/1994 | Gloyna et al. ............... 210/762 |
| 5,560,823 A * | 10/1996 | Whiting ....................... 210/205 |
| 5,571,423 A | 11/1996 | Daman |
| 5,591,415 A | 1/1997 | Dassel et al. |
| 5,997,751 A * | 12/1999 | Higo et al. |

FOREIGN PATENT DOCUMENTS

| | | |
|---|---|---|
| EP | 0 581 229 A1 | 2/1994 |
| EP | 0 814 061 A3 | 12/1997 |
| JP | 3-503858 | 8/1991 |
| JP | 4-260500 | 9/1992 |
| JP | 5-31000 | 2/1993 |
| JP | 7-313987 | * 12/1995 |
| WO | 94/18128 | 8/1994 |

* cited by examiner

Primary Examiner—Steven Bos
(74) Attorney, Agent, or Firm—Wenderoth, Lind & Ponack, L.L.P.

(57) ABSTRACT

A method and apparatus for processing substances by coexisting an object matter with water held at temperature above 200° C. to carry out chemical reactions such as severing of molecular chains, recombination and decoupling occluded molecules, oxidation and reduction reactions. A mixture phase containing an object matter and a liquid medium is subjected to a super-critical state of a medium in a super-critical reaction apparatus, where feed inlets are provided on the upper end, and a product outlet is provided on the lower end. In the interior of the apparatus, the super-critical zone is provided above and the sub-critical zone is provided below, and the object matter and the reaction products are progressed towards a lower end of a reaction chamber in one direction.

20 Claims, 10 Drawing Sheets

F I G. 9
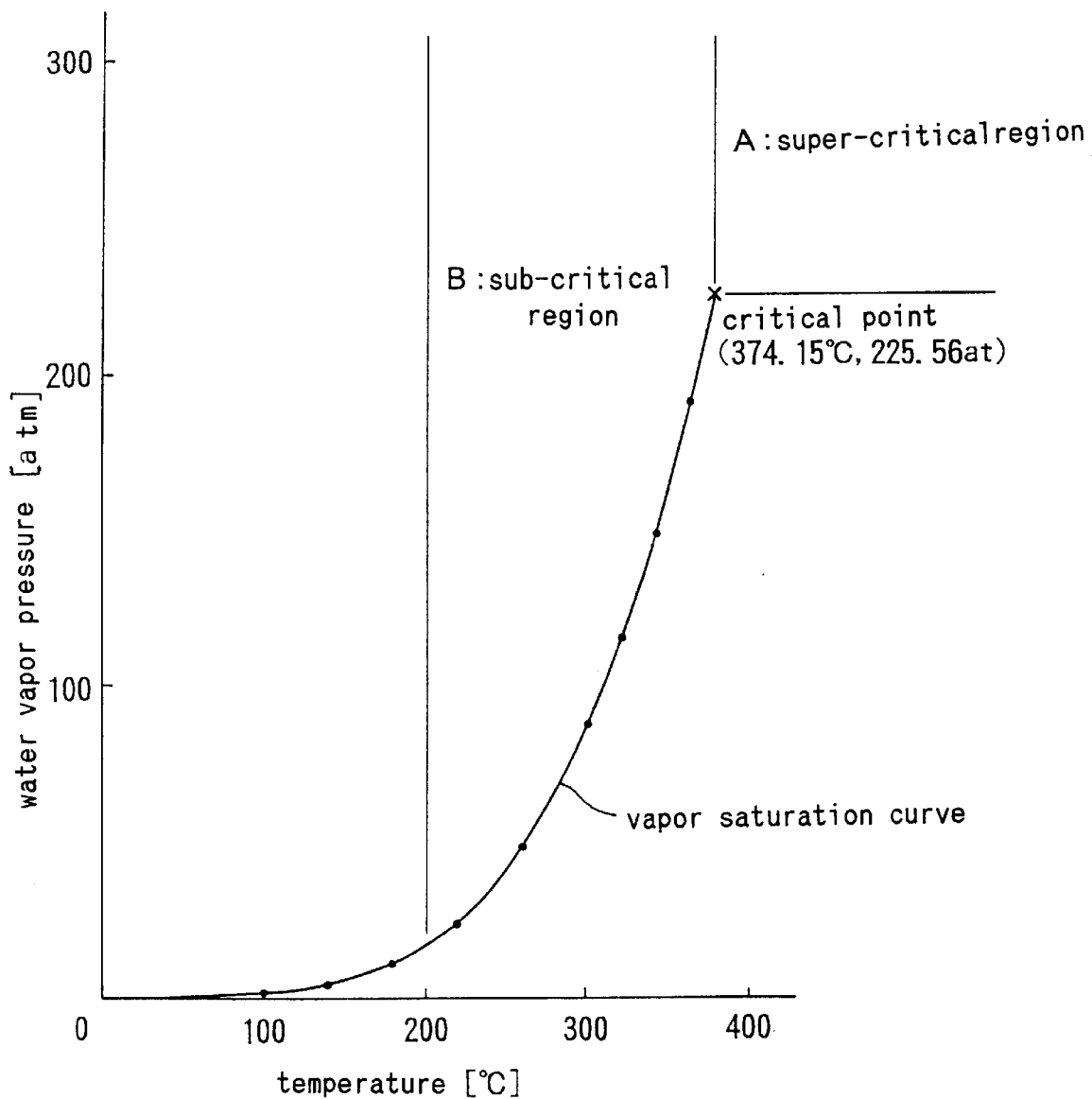

SUPERCRITICAL REACTION APPARATUS AND METHOD

TECHNICAL FIELD

This invention relates to a method and an apparatus for processing matter by hydrothermal reactions, such as rupturing of molecular chains, recombination and decoupling occluded molecules, oxidation and reduction reactions, by holding the matter with water held at temperature above 200° C.

BACKGROUND ART

In recent years, it has been pointed out that ashes generated from incineration of municipal waste contain substances harmful to humans such as dioxin and others, resulting in demands for treatment processing to deal with such matters. Also, needs are increasing for processing halogen compounds, herbicides, PCB, DDT and other organic halogen compounds contained in pesticides, chemical weapons such as poison gas, explosives, substances with high organic contents unamenable to biological processing, waste water containing matters unamenable to biological processing, compounds that suppresses biological metabolic reactions, and other substances that cannot be discharged or left in the environment.

As a method of treating such substances, expectations are high for hydrothermal reactions that hold the substances with water at temperature above 200° C. and perform tasks such as severing of molecular chains, recombination and decoupling occluded molecules, oxidation and reduction reactions. This high expectation is because this type of chemical processing can be carried out in a closed-circuit system and the facility can be relatively small.

Especially, in the so-called super-critical zones, it is known that a medium exists in an unusual middle state that is neither gas nor liquid, and exhibits special physical and chemical properties that can be used to perform various treatments. Here, the super-critical state, when the medium is water, means that the temperature exceeds the critical temperature of 374.15° C. and the pressure exceeds the critical pressure of 225.56 atmosphere, and a state near this critical point, such as temperature between 200 and 374.15° C. at a pressure exceeding the saturated vapor pressure, is called a sub-critical state. Here, in order to create such state, it is necessary to maintain the pressure of the medium to higher than its vapor pressure to avoid the temperature decrease as a result of heat loss caused by latent heat of vaporization. As an example, a relation between temperature and vapor pressure for water is shown in FIG. 9.

Such hydrothermal reactions are useful not only to decontaminate the substances, but are also useful as a technology for converting organic waste matter to carbon slurry, which can be used as a carbon source for fuel or chemical reactions. The process includes steps of: converting organic matter to water slurry; thermal treatment at a high temperature and high pressure condition; washing and dewatering and increasing the calorific value by separating and concentrating dechlorinated solid carbon and oil.

Typical methods and apparatuses for performing super-critical processing are known wherein such steps are conducted as: charging a waste matter to be processed into a vertical pressure chamber; and creating the super-critical zone in the upper half of the chamber and creating a sub-critical zone in the bottom half of the chamber. In such apparatus, chemical reactions such as oxidation reactions are carried out in the super-critical zone, while solid particles that are present in the waste matter or in the reaction products are separated and absorbed in the slurry at the sub-critical zone. A outlet is provided at the top of the chamber to remove the fluid reaction products of the super-critical state region. This discharge fluid is sent to the next processing station through piping provided with a filter, where solid particles included in the reaction products are removed.

In such apparatus, the pressured matter is charged into the super-critical zone provided at upper region of the chamber through a supply pipe. Oxidation of organic substances such as dioxin are carried out in the super-critical zone, and the fluid layer at the super-critical temperature first flows downward and then flows upward. Therefore, combusted liquid waste is discharged through the pipe at the top of the chamber, but the inorganic substances contained in the charged matter, which do not dissolve in the super-critical zone, are precipitated. These precipitates continue to flow downward, due to momentum and gravity forces, and reach the liquid phase in the sub-critical zone. The liquid phase in the sub-critical zone dissolves organic substances that do not dissolve in the super-critical zone, and forms a slurry which does not dissolve in the super-critical zone. The slurry thus obtained is discharged through a pipe provided at the bottom of the chamber which is in the sub-critical zone.

However, in such conventional technology, because the inside wall of the reaction chamber is exposed to the super-critical temperature and strong oxidation ambient, even expensive material such as Inconel are attacked by corrosion. Also, because of this concern for corrosion, it was not possible to raise the reaction temperature too much. Furthermore, the use of such expensive materials, in a thickness range of several centimeters which is necessary to withstand the high pressure above 225.56 atmosphere, results in a very costly apparatus.

In the case of decomposition of substances like dioxin, that are highly toxic at very small amounts, it was very common to use a second reactor in addition to the main reactor. This is because the super-critical oxidation reaction alone cannot raise the temperature high enough to obtain appropriate reaction rates, resulting in insufficient residence time in the chamber for the reacting substances. Also, if the waste matter contains porous matter, only the surface is reacted but the interior matter may be left unprocessed, so that there is danger of retaining toxic substances in the residues.

Also, because the pressure chamber almost behaves as a complete mixing reactor, there is a possibility of some of the substances to be processed flowing out of the chamber without having been processed. One of the possible methods to prevent this is to increase the flow rate by re-circulating the fluid inside the chamber so that increased inflow can stir and mix the contents of the chamber. Another method is to provide a secondary processing chamber for processing the unreacted substances.

Salts are not dissolved in the super-critical zone and are precipitated, whereas they are dissolved and diluted in the sub-critical zone to be discharged. However, a diffusive boundary region between the super-critical and sub-critical zone is exposed to a severe condition where alternating drying and wetting actions take place, and may grow scales consisting of salts and other retained solid particles in its vicinity. For this reason, the location of the boundary region is periodically moved by adjusting the process, and the grown scales must be removed by stopping the process.

Some of the scales are difficult to remove, and may even necessitate disassembling the chamber, especially when the chamber is used for processing municipal waste incineration ashes, which may contain calcium, potassium, sodium, chlorine, and sulfur, very often in concentration as high as 10–20%. As a result, it is expected that the chamber cannot be operated over a prolonged period.

Furthermore, when removing the fluid directly from the super-critical zone of the chamber, precipitated microparticles of salts and solid particles originally contained in the waste matter may sometimes be carried out together. Therefore, it is necessary to remove the particles at the reaction products in the super-critical state with a filter to prevent corrosion of the delivery pipe. However, because the process temperature exceeds 374.15° C., the filter must be made of expensive materials such as ceramics, and often faces clogging problems.

Furthermore, relatively non-fluid substances such as salts and occluded solid particles tend to settle in the bottom of the chamber. To remove such settlings, it is necessary to introduce a carrying fluid medium separately in addition to the original feed water. The result is that the amount of by-products increases, and post-process treatments become overloaded.

Furthermore, when the reaction products are re-circulated, the feed material is diluted with the reaction products, and the feed and reaction products are mixed completely in the super-critical zone, it is not possible to form a localized high-temperature high-speed reaction field, as one in a usual air combusted flame. For overcoming this low temperature, increasing the reaction times is very often required.

The purpose of this invention is to provide a practical method and apparatus for conducting high-temperature hydrothermal reaction for resolving the problems in the conventional technologies outlined above.

SUMMARY OF THE INVENTION

This invention relates to a super-critical reaction apparatus for processing a mixture phase, comprising an object matter to be processed and a medium in a liquid form, by subjecting the mixture phase to the super-critical state of the medium. The apparatus has: a reaction chamber of a substantially vertical cylindrical shape with a feed supply inlet at an upper end and a product outlet at a lower end; and an interior section of the reaction chamber comprising the super-critical zone above and a sub-critical zone below, wherein the object matter and reaction products are progressed in one direction towards the lower end.

Accordingly, compared to the case of withdrawing the reaction product in the super-critical state, it is possible to process the waste matter at much lower temperatures so that the post-treatments are significantly simplified, and residues of lower fluidity, including salts, are not formed, thus eliminating the necessity for supplying water for processing the residues separately. This also results in simplifying the post-treatment processes.

Also, since the process is carried out in one direction, there is no need for complex arrangement for circulating the mixture phase in the reaction chamber as in the conventional apparatus, so that the apparatus itself and controlling method of operation are significantly simplified.

The reaction chamber may be designed with a length at least four times higher than the diameter. Also, the reaction chamber may be made with a double-walled cylinder to form a thermal fluid passage surrounding the super-critical zone and/or the sub-critical zone. In such case, it is possible to generate a reaction field at elevated temperatures, higher than 600–650° C., which are the usual limiting temperatures for metallic materials. Therefore, with the aid of combustion heat generated by an auxiliary fuel, it is possible to operate the apparatus continuously at temperatures in the range of 650–800° C., exceeding thermal resistance temperature of metals.

The feed supply inlet may comprise a slurry supply nozzle for feeding a slurry or a liquid containing the object matter, and a medium supply inlet for feeding a medium at a temperature exceeding the critical temperature.

The super-critical zone may be provided with a tubular structure for forming a localized continuous reaction field. The tubular structure having one end opened to the feed supply inlet and other end opened towards downstream.

In a lower section of the reaction chamber, a tubular discharge section may be disposed transversely to the sub-critical zone. The discharge section may be constructed with a certain angle to horizontal direction and a gas outlet may be provided in an upper end.

The discharge section may be provided with a mechanical type transport device for moving the slurry phase. The transport device may comprise transport screws. The transport screws may comprise vanes disposed discontinuously about a shaft. The transport device may be connected to a drive source by way of a coupling section using a fluid sealing mechanism.

The thermal fluid fed at the thermal fluid passage may be a medium at a temperature less than the critical temperature of the medium. A part of the medium supplied to the thermal fluid passage can be heated to a temperature higher than the critical temperature, and delivered to the feed supply of the reaction chamber.

The apparatus may be provided with a scraping device for scraping objects adhering to and/or growing on the internal wall surface of the sub-critical zone in the reaction chamber or a stirring device for stirring a mixture phase.

A pre-treatment vessel at a sub-critical temperature may be further provided for pre-processing the object matter to be sent to the reaction chamber. The pre-treatment vessel may be provided with an outlet for discharging an object matter at substantially the same height of the feed supply inlet of the reaction chamber.

The apparatus may be provided with a cooling device downstream of the reaction chamber for further cooling the object matter and a separation tank for separating vapor/liquid from cooled object matter by subjecting the object matter to a reduced pressure. A pressure reducing device may be provided between the reaction chamber and the cooling device. The pressure reducing device may comprise at least two pressure reducing tanks separated by a middle valve. After filling a first tank with an object matter, the middle valve is opened and the object matter is expanded into a second tank in such a way to reduce pressure of the object matter. A heat exchanger may be provided to preheat the object matter using the gas phase produced in the separation tank.

This invention relates also to a method for performing the super-critical reactions by subjecting a mixture phase comprising an object matter and a medium to the super-critical temperature of the medium. The method comprises: a first step of producing a sub-critical state in the mixture phase in the absence of oxidizing agent; and a second step of producing the super-critical state in the presence of an added oxidizing agent.

After the second step, the method may further comprise a third step of producing a single liquid phase or a mixture phase containing a liquid phase and solid substances, or noncondensable gases, by cooling to the sub-critical temperature, and includes a step of withdrawing it from a reaction tower at a temperature less than the critical temperature. The second step may be carried out inside an inner wall held at a temperature less than the critical temperature.

The inner wall may be maintained at a temperature less than the critical temperature by flowing a fluid along an outer surface of the inner wall held at a pressure equal to, or substantially higher than a pressure of the object matter at less than the critical temperature.

The second step may be carried out inside the tubular structure for producing localized continuous reaction fields in the inner wall. The second step may also be carried out in a substantially vertical cylindrical reaction chamber comprising the upstream super-critical zone and the downstream sub-critical zone, and the object matter and reaction products are moved in one direction towards a lower end in the reaction chamber.

An object matter, an oxidizing agent and a medium at the super-critical temperature may be supplied to the super-critical zone in the reaction chamber. Here, oxidizing agents include oxygen-containing gases such as oxygen gas or air, or so-called oxidizers such as hydrogen peroxide.

The method may include a step of pre-liquefying the object matter, or may include a step of treating the object for becoming the pH value neutral or weakly acidic by adding acid or alkaline prior to processing. Also, a temperature higher than the critical point may be achieved by combustion reactions at the super-critical zone with the addition of auxiliary fuel to the object matter.

To prevent the separation of the object matter and the medium, a dispersant may be added to the object matter.

This invention also relates to a method for producing the super-critical reaction by subjecting a mixture phase containing an object matter and a medium to the super-critical state of the medium to carry out a reaction, and subjecting the mixture phase containing reaction products to a post-treatment in the sub-critical state.

This invention also relates to an apparatus for processing substances by subjecting a mixture phase, containing an object matter and a liquid medium, to the sub-critical state or the super-critical state. The apparatus has: a reaction chamber of a substantially vertical cylindrical shape with a feed supply inlet at an upper end and a product outlet at a lower end, and for forming a reaction zone in interior, wherein the object matter and reaction products are moved in one direction towards the lower end in the reaction zone formed in interior of the reaction chamber.

This invention also relates to an apparatus for processing substances by subjecting a mixture phase, containing an object matter and a liquid medium, to the sub-critical state or the super-critical state. The apparatus has: a reaction chamber of a substantially vertical cylindrical shape with a feed supply inlet at an upper end and a product outlet at a lower end, and a reaction zone formed in interior, wherein the reaction chamber is a double-walled cylinder comprising an inner sleeve and an outer sleeve to form a thermal fluid passage surrounding the reaction zone. The inner sleeve may be detachably installed, and may be assembled by insertion. Also, the liquid medium flowing through the thermal fluid passage may be a thermal fluid.

The reaction zone in the sub-critical state may include a vane section for scraping substances adhered to the inner wall and/or stirring a mixture phase. The vane section may have a sealing mechanism for retaining the medium under pressure around an area enclosing a shaft hole for inserting a drive shaft.

Oxidation reactions may be performed by using a medium in the sub-critical state in conjunction with any of the apparatuses disclosed above.

This invention also relates to a method for producing oxidation reactions by subjecting a mixture phase, containing an object matter and a liquid medium, to the sub-critical state of the medium. The method comprises: a first step of producing the sub-critical state in the mixture phase in an absence of oxidizing agent; and a second step of producing the super-critical state with an added oxidizing agent.

BRIEF DESCRIPTION OF DRAWINGS

FIG. 9 is a diagram showing the super-critical fluid region of water; and

DETAILED DESCRIPTION OF THE INVENTION

Figure 1:
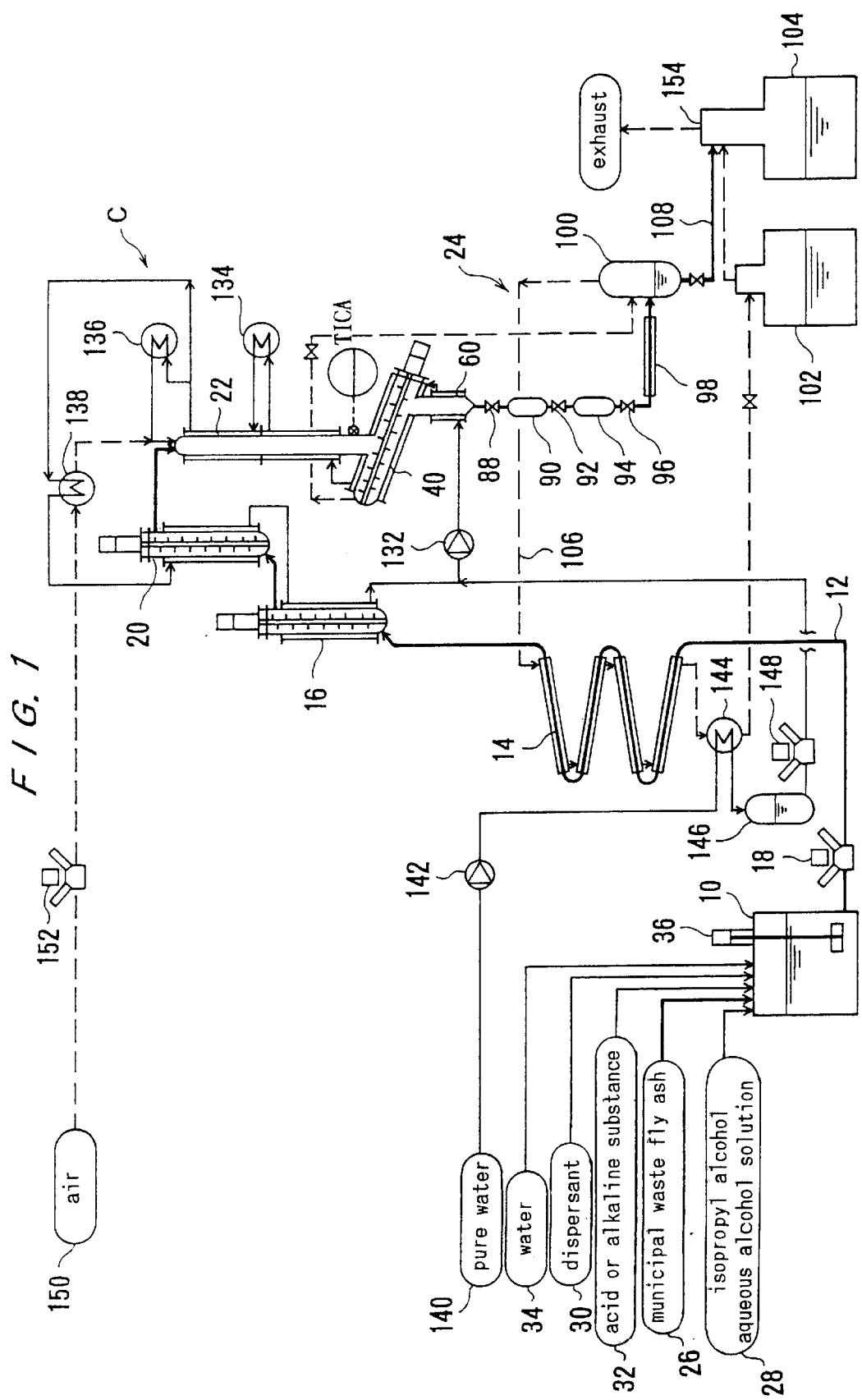
FIG. 1 is a diagram illustrating an embodiment of the overall structure of a processing apparatus.
Figure 2:
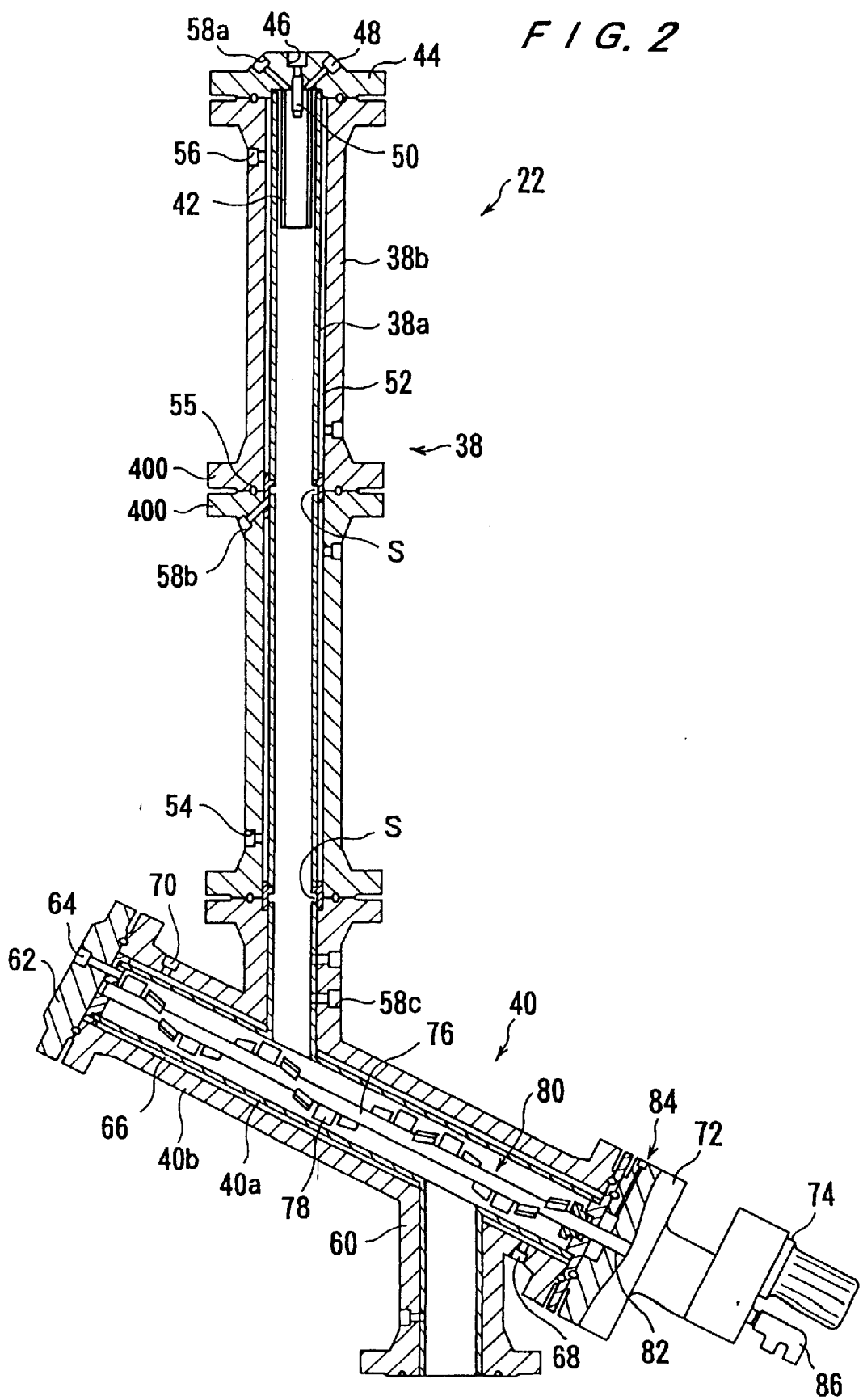
FIG. 2 is across sectional view of a super-critical reaction tower in the present processing apparatus shown in FIG. 1.
Figure 3:
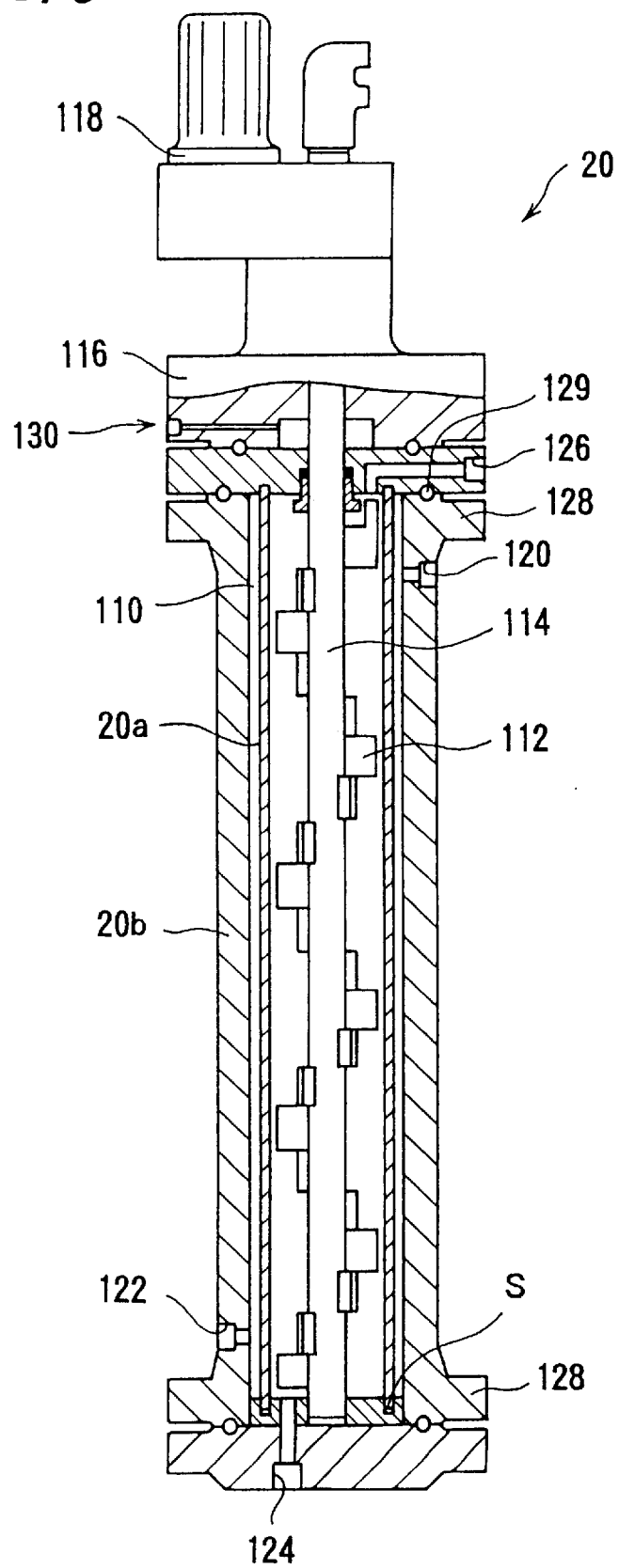
FIG. 3 is a cross sectional view of a sub-critical reaction tower in the processing apparatus shown in FIG. 1.

FIGS. 1 to 3 show an embodiment of the processing apparatus of the present invention, and in this case, an example related to processing fly ash produced when municipal waste is incinerated, is illustrated. Of course, the apparatus can be used for processing soils contaminated with PCB or liquid waste, for example, instead of fly ashes.

The processing apparatus comprises: a slurry system for carrying out the steps of converting the ash to slurry, raising the temperature of the slurry to bring it to the sub-critical state and further to the super-critical state, performing an oxidation reaction, and separating the reaction products for post-treatment and recycling; a water feed system for supplying super-critical water and sub-critical water for cooling or maintaining the temperature in various reactors; and a control system for monitoring properties at predetermined locations in the passages and apparatuses so as to maintain optimum operating conditions. In the following description, "slurry" also includes mere liquid wastage that does not contain any suspended substances.

First, the slurry system comprises: a slurry adjustment tank 10 for making the slurry from the fly ash to be processed by dissolving it with water and adjusting pH; a slurry pressurizing pump 18 for pressurizing the slurry and transporting it from the slurry adjustment tank 10 to a first slurry preheater 14 and a second slurry preheater 16 through a slurry pipe 12; a sub-critical reaction tower 20 for bringing the heated slurry to the sub-critical state after adding isopropyl alcohol; a super-critical reaction tower 22 for bringing the slurry to the super-critical state by adding high temperature super-critical water and air as an oxidizing agent; a post-treatment section 24 for, after reducing the pressure with flushing, separating a gaseous phase from the slurry by cooling the processed slurry, and for storing the slurry in a container and discharging gas to the environment.

The slurry adjustment tank 10 comprises: a line 26 for supplying incinerated ash to be processed; a storage tank 28 for storing isopropyl alcohol which is added as an exothermic agent for adjusting a temperature in the super-critical reaction vessel in a later stage; a dispersant agent tank 30 for supplying a dispersant to prevent separation of solid components from the liquid phase; a tank 32 for storing alkaline or acid for adjusting pH of the slurry; a water tank 34; and a stirrer 36 for mechanically stirring and homogeneously mixing the slurry to prevent settling of solid particles and floating of oils.

As shown in FIG. 2, the super-critical reaction tower 22 comprises: a tower structure 38 having a substantially vertical cylindrical shape; and a discharge section 40 disposed at the bottom section inclined at an angle to the horizontal plane. The tower structure 38 and the discharge section 40 are both constructed as double-walled structures comprising an inner sleeve 38a, 40a and outer sleeve 38b, 40b, respectively. A flame holding tube 42 is installed with a space between the inside of the inner sleeve 38a of the tower structure 38, and extends for some distance from the top of the tower, which is made of a ceramic material such as silicon carbide. A lid 44 covers the top of the tower structure 38, and is provided with a slurry inlet 46, which communicates with a slurry feed nozzle 50 extending downwards from the bottom surface of the lid 44, and a super-critical water inlet 48, both of the inlets opening into the flame holding tube 42.

A thermal fluid passage (sub-critical water passage) 52 is provided in the space between the inner sleeve 38a and the outer sleeve 38b of the tower structure 38, for receiving sub-critical water from a sub-critical water supply inlet 54 and discharging it with a sub-critical water outlet 56 installed at the upper region of the tower structure 38. Thus, the overall temperature of the tower structure 38 is maintained at a temperature higher than the critical temperature, and the inner sleeve 38a is maintained at a temperature less than the critical temperature.

The length of the inner sleeve 38a of the tower structure 38 is, at least four times or, preferably more than eight times the inside diameter. The inside diameter is made small so that the interior flow under normal operation conditions is almost piston flow from top to bottom of the tower structure 38.

The inner sleeves 38a, 40a of the tower structure 38 and the discharge section 40 and the slurry feed nozzle 50 are made of a high grade corrosion-resistant material such as Inconel because the slurry contains chlorine and other corrosive substances. Here, as these parts are cooled by the sub-critical water, there are few problems of strength degradation caused by high temperatures. The thickness of the inner sleeve 38a does not have to be very thick. The pressure difference between the interior of the inner sleeve 38a and the sub-critical water passage 52 is at the most one atmosphere, so that there is little force applied to the parts of the inner sleeve 38a. The thickness of sleeve 38a has to be only thick enough to allow machining. The inner sleeve 38a is designed as a simple tubular shape to reduce its manufacturing cost, and is assembled by insertion to facilitate easy exchanging when it suffers corrosive or mechanical damage by super-critical processing conditions. Because thermal expansion may differ depending on the materials and temperatures, thermal expansion joints S can be provided in certain locations to absorb such thermal expansion.

The outer sleeve 38b, forms a pressure vessel for containing high pressure fluids such as sub-critical water and the slurry, so it is made of a thicker material than the inner sleeve 38a, and comprises upper and lower sections joined by flanges 400. Because the inside surface is protected by the inner sleeve 38a and it is not exposed to the slurry, and it is cooled by the sub-critical water, there is no problem of high temperature strength degradation. Therefore, the outer sleeve 38b may be constructed using carbon steels or ordinary boiler steels. The joint between the flanges 400 is sealed by a metal seal 55 comprising a metal ring made of a corrosion-resistant metal such as Inconel and SUS. The metal ring withstands high temperature and high pressure conditions, deforming the contact line when the flanges 400 are coupled.

The flame holding tube 42 is placed at the top location in the super-critical reaction water tower, where very severe oxidation reactions take place and offers protection to the inner sleeve 38a from the super-critical water oxidizing atmosphere, and also works to prevent a temperature drop by preventing heat loss to the inner sleeve, and also stabilizes the internal flow. The flame holding tube 42 allows for continuous super-critical water oxidation reaction fields. The gap of several mm between the flame holding tube 42 and the inner sleeve 38a also avoids heat transfer, and destabilization of the continuous super-critical water oxidation fields due to cooling is also prevented. The temperature range for continuous stable oxidation reactions has to be higher than 500–550° C. in principle, and is preferably about 600° C., but when processing refractory compounds, it is possible to raise the temperature to as high as 650–800° C. This can be realized by utilizing heat of combustion reaction produced by auxiliary fuel such as alcohol.

The length of the flame holding tube 42 is at least twice or preferably more than three times the internal diameter, but it is not desirable for it to be too long, because the excessive length may create the sub-critical state in the mid-section. The particles and salts subjected to repeating wet and dry cycles can adhere and solidify in the critical point vicinity, and it might result in blocking the reaction tower 38.

Temperature measuring ports 58a, 58b, 58c are provided in three locations, at the top section, inner sleeve joint section and bottom section to measure the temperatures in important sections of the super-critical reaction tower 22, and their output terminals are connected to the control section that is not shown. The top temperature sensor is used to check if there is abnormality in the super-critical water oxidation reactions, and the results are used to control the parameters that affect the super-critical water oxidation temperatures, such as the amount of supplied super-critical water, slurry, and isopropyl alcohol supplied to the reaction zone. This sensor is one important key control sensor, and it is preferable to have at least two sensors for increasing system safety.

The slurry discharge section 40 is constructed as a double-walled structure, and is inclined at an angle to the horizontal direction, and the bottom end of the tower structure 38 is connected to a location slightly higher than the slurry discharge section's middle section. The slurry discharge section's bottom surface, which is slightly lower than the middle section, is connected to the top end of a slurry discharge pipe 60. A gas outlet 64 that keeps the internal pressure constant is formed on a lid 62 located above the discharge section 40. The gas outlet is to release a gaseous phase containing noncondensable gases such as oxygen, nitrogen and carbon dioxides. The space between the inner sleeve 40a and the outer sleeve 40b is also a thermal fluid passage 66 used to flow sub-critical water. The sub-critical water is supplied from a lower sub-critical water inlet 68 and is discharged from an upper sub-critical water outlet 70.

In the interior of the discharge section 40 is provided a transport screw 80 comprising a rotational shaft 76 driven by a reduction-geared motor 74 attached to an outer surface of a bottom lid 72, and spiral vanes 78 provided on the rotational shaft 76 for discharging the slurry. The vanes 78 of the transport screw 80 located above the outlet of the slurry discharge pipe 60 are arranged with right-handed thread while those vanes 78 located below the outlet are arranged with left-handed thread. When the shaft 76 is rotated in the direction of the arrow, the slurry is moved to the opening of the slurry discharge pipe 60, from both top and bottom sections of the discharge section 40. The bottom lid 72 of the discharge section 40 has a through hole 82 for accommodating the rotational shaft 76, and around the through hole is provided a seal section 84 for flowing pressure-fed seal water diverged from the sub-critical water circulation loop C so that the slurry does not enter the through hole 82.

Several vanes 78 are disposed and discontinuously spaced on the transport screw 80 and the slurry can flow out through the spaces. This arrangement reduces adhesion of slurry on the vanes 78 and prevents malfunction of the transport screw 80 due to solidification of the slurry on the entire screw section. The rotational shaft 76 is cooled by cooling water supplied through a rotary joint 86. It should be noted that, when the slurry concentration is low and the slurry can be smoothly discharged with just gravity, the transport screw 80 is not necessary.

The post-treatment section 24 follows the slurry discharge pipe 60 of the super-critical water reaction tower 22. The post-treatment section comprises: an inlet valve 88, a pressure reducing fore-tank 90, a middle valve 92, a pressure reducing aft-tank 94, an outlet valve 96, a slurry cooler 98, a flushing tank (vapor liquid separation tank) 100, storage tanks 102, 104 for storing condensed water and processed slurry, respectively. The slurry cooler 98 is provided to prevent excessive vaporization from the slurry which may result in less fluidity of the slurry due to excessive loss of water. The gas outlet 64 of the slurry discharge section 40 has a gas pipe 106 for discharging separated gases from the top of the flushing tank 100, and the discharged gas is supplied as heat source for the first slurry heater 14 and is led to the condensed water tank 102. Also, a slurry discharge pipe 108 for guiding the degassed slurry to the processed slurry storage tank 104 is provided at the bottom of the flushing tank 100.

FIG. 3 shows the structure of the sub-critical reaction tower 20, which is a heat exchanger having an internal uniaxial stirrer, and has a double-walled construction comprising an inner sleeve 20a and an outer sleeve 20b which form a thermal fluid passage (sub-critical water passage) 110 therebetween. A rotational shaft 114 having stirrer/scraper vanes 112 is provided in the interior of the inner sleeve 20a, and a reduction-geared motor 118 for rotating the shaft is provided above a top lid 116. The inner sleeve 20a is made of a high grade corrosion resistant material such as Hastelloy to guard against the corrosive substances such as chlorides contained in the slurry. The outer sleeve 20b forms a pressure vessel for containing high pressure fluids such as the sub-critical water and the slurry. The outer sleeve 20b is protected by the inner sleeve 20a and this is not in contact with the slurry. Ordinary boiler carbon steel can be used here.

The pressure difference between the slurry inside the sub-critical reaction tower 20 and the sub-critical water is about the same as that for the super-critical reaction tower 22, and even if the sub-critical water pressure is slightly higher, it is about one atmosphere at the most. Thus, there is little pressure applied to the inner sleeve 20a, so the thickness of the inner sleeve 20a does not need to be very thick and needs only the thickness to allow machining. However, some joints S for a thermal expansion absorber are placed to compensate the difference in thermal expansion caused by difference in material or temperature conditions.

The sub-critical water is cooled by heat exchange with the slurry and becomes heavy, so it is supplied from the upper inlet 120 and is discharged from the lower outlet 122. The slurry flows countercurrent to the sub-critical water and an inlet 124 is placed at the bottom and an outlet 126 is placed at the top. The outlet 126 is placed slightly above the slurry inlet 46 of the super-critical reaction tower 22 for increasing the slurry transport efficiency.

The stirrer vanes 112 are used to prevent obstruction of operation caused by calcium scales that are grown or the like, and are installed on the rotational shaft 114. The vanes 112 can sweep almost all of the surface of the inner sleeve 20a by keeping a gap of about 1–3 mm between the tips of vanes and the inner surface. These vanes also work to promote thermal conduction between the slurry and the sub-critical water by constantly rotating the stirrer/scraper vanes 112 for stirring the slurry, because such thermal conduction rate is dependent on the mass transfer of the slurry. It also serves to avoid the precipitation of ashes in the slurry; once the velocity in the heat exchanger is low by mixing the slurry.

Joints such as in a flange 128, likewise in the super-critical reaction tower 22, are made leak proof by using metal ring seals 129 made of high-temperature and high-pressure resistant materials such as SUS and fitted in a groove formed on the flange surfaces. Also, a seal section 130 is provided around the through hole for the shaft at the motor side flange for preventing inflow of the slurry into the hole, by supplying pressurized seal water distributed from the sub-critical water circulation loop C. The stirrer/scraper vanes 112 are arranged discontinuously in a right-handed thread, when the stirrer shaft 114 is rotated in the direction of the arrow shown in FIG. 3, the slurry is successively transported upwards. The structure of the second slurry preheater 16 is substantially the same as that of the sub-critical reaction tower 20 except that the temperature is lower, thus the explanation will be omitted.

Next, the water supply system for super-critical and sub-critical water will be explained. The super-critical reaction tower 22, sub-critical reaction tower 20 and second slurry preheater 16 are provided with the sub-critical water circulation loop C. The circulation loop C starts from an outlet of a sub-critical water circulation pump 132 and enters from the lower inlet in the thermal fluid passage of the discharge pipe 60 in the super-critical reaction tower 22, and exits from the upper outlet, then enters from the lower inlet 68 in the thermal fluid passage 66 of the discharge section 40 and exits from the upper outlet 70, and further enters from the lower inlet 54 in the thermal fluid passage 52 of the tower structure 38 and exits from the upper outlet 56. The circulation loop C passes through a sub-critical water heater 134, disposed between the lower and upper sleeves of the tower structure 38, and the temperature of the circulating water is adjusted when necessary.

The sub-critical water circulation loop C branches after exiting from the upper outlet 56, and a portion of it is supplied, after being heated at a super-critical water heater 136 to the super-critical temperature, to the top-and into the interior of the tower structure 38. The other portion passes through a air preheater 138 and heats supply air, passes through sub-critical reaction tower 20, by entering the upper inlet 120 of the thermal fluid passage 110 and exiting from the lower outlet 124, and enters the upper inlet in the thermal fluid passage of the second slurry preheater 16 and exits from the lower outlet to return to a suction opening of the sub-critical water circulation pump 132.

Since a portion of the circulating water is supplied as a reaction medium in the super-critical reaction tower 22, a make-up water distribution pipe system is provided to deliver make-up sub-critical water. This line comprises: pure water 140 which has been deionized through an ion exchanger; a degassing vessel water supply pump 142 that raises the pressure to 3–5 atmospheres; make-up water preheater 144 for heating to a temperature above 100° C., normally between 120–140° C. by using gas or liquid that has been heated through the first slurry preheater 14; a degassing vessel 146 for removing noncondensable gases, especially oxygen, from the heated water; and a make-up water supply pump 148 for merging the heated water to the sub-critical water circulation loop C at the suction of the sub-critical water circulation pump 132. Make-up water has to be completely removed of oxygen by adding deoxidizer agent or boiler compounds to prevent corrosion and scaling in the line.

Furthermore, the super-critical reaction tower 22 is provided with an air supply line for supplying air for oxidation reactions. This line comprises: dehumidified air source 150; a high pressure compressor 152 for pressurizing the dehumidified air to slightly higher than the pressurized slurry; the air preheater 138 for preheating with sub-critical water exiting from the super-critical reaction tower 22; and a line connecting to the super-critical water inlet 48 of the super-critical reaction tower 22, which passes to the merging point with the super-critical water flow.

Next, the operation of the organic waste processing apparatus having the structure described above will be explained. First, the operation of the slurry system will be explained. Fly ash of incinerated municipal waste is processed in the slurry adjustment tank 10 by stirring with dispersant, acid, aqueous isopropyl alcohol solution, and water to produce a neutral or slightly acidic slurry with pH 7-3, and solid content 5–40 wt %, preferably 10–30 wt %.

The amount of isopropyl alcohol is controlled to achieve a steady state continuous oxidation reaction in the super-critical reaction tower 22. In other words, the feed has to be adjusted to the slurry temperature reaches above 550° C., preferable around 600° C., by the heat generated by oxidation. If the object matter is a refractory material, the amount can, be increased to raise the temperature to a higher value. This amount is around 2–20 wt % in the slurry, usually 4–10 wt %. Of course, by increasing the amount of super-critical water supplied to the super-critical reaction tower 22, it is possible to decrease the supply rate of isopropyl alcohol. However, in this case, a greater quantity of heat is required at the super-critical water heater 136 to heat the sub-critical water entering from the thermal fluid passage 52. Instead of isopropyl alcohol, water soluble and readily oxidizable organic agents such as other alcohols and ketones may be used.

Dispersants are added to prevent settling of solid particles in the slurry lines or in the heat exchangers. The dispersants are not necessary when the slurry speed can be maintained at 1–3 m/s, or when solids are not supposed to be precipitated from the slurry in such cases that the slurry concentration is sufficiently high, or the solid particles are sufficiently fine, or slurry viscosity is high.

The slurry adjusted by the above steps is pressurized in the slurry pressurizing pump 18 to a pressure higher than 225.56 atmosphere, normally 240–400 atm, preferably 240–300 atm. Then the slurry passes through the first slurry preheater 14, second slurry preheater 16 and sub-critical reaction tower 20, and the temperature is raised by indirect heating and subjection to the sub-critical reactions, primarily consisting of reduction reactions, and is sent to the highest section of the super-critical reaction tower 22.

In the highest section of the super-critical reaction tower 22, super-critical water heated by the super-critical water heater 136 to 600–650° C. and preliminarily mixed with oxidizer air is supplied from the super-critical water inlet 48 to the interior of the flame holding tube 42. The air supply rate is determined on the basis of the oxygen necessary to oxidize the alcohol in the slurry, its decomposition products, unburned carbon contained in ashes and other combustible matters. That is, the air amount to be supplied is between 1.0 and 1.5 times the stoichiometric value, preferably between 1.1–1.3 times. Accordingly, combustible matters in the slurry are oxidized and are increased in temperature to form a continuous localized high temperature and high speed oxidation fields, mainly inside the flame holding tube 42, resulting in quick disintegration of combustible matters.

The slurry in the super-critical state continues to descend while oxidizing the residual matters through the longitudinally elongated tower structure 38 by being pushed down by the slurry feed and a mixture of super-critical water and air continually being supplied to the top of the tower structure 38. During this stage, the slurry is cooled by the fluid in the thermal fluid passage, and decreases in temperature to reach the sub-critical temperature of less than 374.15° C. the slurry then arrives at the discharge section 40.

In the discharge section 40, the slurry continues to be cooled by the rotational shaft 76 and wall surfaces, and sub-critical zone is reformed again. The slurry is supplied to the entrance of the discharge pipe 60 by being carried by gravity or scraped by the slurry discharge vanes 78, and comes down to the discharge pipe 60. Residual oxygen in the slurry, nitrogen in the supplied air, carbon dioxide produced in the oxidation reactions, and other noncondensable gases are accumulated gradually in the vicinity of the gas outlet 64 in the upper section of the discharge section 40.

The slurry accumulated in the discharge pipe 60 is further discharged to the flushing tank 100 in the following manner. First, the middle valve 92 is closed and the inlet valve 88 is opened to admit the slurry in the pressure reducing fore-tank 90 and the inlet valve 88 is closed. Next, middle valve 92 is opened to expand the volume to the joint volume of the fore- and aft-tanks 90, 96 and the slurry pressure is reduced. Next, middle valve 92 is closed, and outlet valve 96 is opened, thus slurry is sent to the flushing tank 100 by its own pressure, after which, outlet valve 96 is closed for withdrawing the next slurry.

By repeating this process, high pressure slurry above 225.56 atm is reduced in pressure to levels of 3–20 atm, preferably 12–20 atm, and delivered to the flushing tank 100. If, by such pressure reduction, the water contained in the slurry is excessively removed through the flushing operation, the fluidity may become too low and the slurry transport to the next processing stage could be prohibited. For this reason, the slurry is preliminarily cooled to a suitable temperature using the double-walled slurry cooler 98, provided between the outlet valve 96 and the flushing tank 98, where a part of the flushed water is condensed. If the slurry is static, cooling from wall surfaces is not effective because there is little mass transfer and little heat transfer. But in this case, the slurry is present with some vapor and transfer by its own pressure to the flushing tank 100 takes place. The heat exchange rate between the slurry and the wall surfaces is high enough and even with a small cooling area, good cooling effect can be achieved.

Here, the reason for this repeated opening and closing valve operation to withdraw liquid phase or slurry phase is to protect the valves. Because of the high pressure difference across the valves, if the valves are used with partial opening, valve body and valve casing are exposed to severe jet of vaporizing liquid phase or slurry phase. This can result in rapid wear or liquid intrusion into the rear sections or drive sections to spoil the valves. For this reason, for withdraw the slurry phase to the flushing tank 100 with pressure reduction, repetitive action of full opening or total closing of the valves is carried out.

Noncondensable gases withdrawn from the outlet 64 of the discharge section 40, together with the water vapor flushed from the slurry in the interior of the discharge section 40, are introduced to the flushing tank 100 and separated from the liquid phase. Vapor phase containing high concentration of steam is sent to the first slurry preheater 14 as heat source, and is further sent to the make-up water preheater to heat the make-up water, and is introduced to the condensed water tank 102 where the condensed water is removed, and is sent to the processed slurry tank 104.

The slurry accumulated at the bottom of the flushing tank 100 is blown and flushed into the processed slurry tank 104 by periodically operating the valves thereby to maintain its level constant. Gases from the condensed water tank 102 and harmless gases removed from the slurry are discharged from the outlet 154 in the processed slurry tank 104.

In this process apparatus, the whole mixture of object matter and the medium, which is super-critical water, flows in one direction in the super-critical reaction tower 22, and after passing through the sub-critical zone where the temperature and the pressure are lowered, the mixture is discharged in a slurry state to be further processed. Therefore, compared with the case of withdrawing the substances in the super-critical state, processing can be performed at lower temperature and pressure, and post treatment processes can be significantly simplified. Additionally, low fluidity residues, including salts are not formed in the super-critical reaction tower 22, and consequently, there is no need to supply another amount of water separately to deal with such residues which also simplifies the post treatment process.

Also, unlike the conventional apparatus, the flow is unidirectional, and there is no need for a complex structure such as for circulating mixture phases in the reaction tower 22. Thus significantly simplify not only the apparatus itself but also the control systems.

Next, the operation of the water supply system will be explained. In the make-up water passage, pure water 140, which has been deionized with ion exchanger, is pressurized, in the degassing vessel water supply pump 142 up to 3–5 atm, and the make-up water preheater 144 heats it to a temperature above 100° C., normally between 120–140° C., and the degassing vessel 146 removes noncondensable gases, especially oxygen, from the heated water. The pressure of degassed water is raised at the make-up water supply pump 148 to a value slightly higher than the pressure produced in the slurry pressurizing pump 18. This pressurized and degassed water merges at the suction side of the water circulation pump 132 and make-up the sub-critical water circulation loop C.

In the sub-critical water circulation loop C, water exiting from the sub-critical water circulation pump 132 ascends to the thermal fluid passage in the slurry discharge pipe 60, and cools the slurry by passing through the inner sleeve, and the water itself is raised in temperature by exchanging heat, and repeats this action in the thermal fluid passage 66 in the slurry discharge section 40, and the thermal fluid passage 52 of the tower structure 38 in the super-critical reaction tower 22. As the super-critical condition cannot be maintained long enough in the top section of the super-critical reaction tower 22, if the wall temperature becomes too low, a heating operation is done by the sub-critical water heater 134, provided midway in the sub-critical water passage. The usual temperature at the outlet of the thermal fluid passage 52, in the super-critical reaction tower 22, is maintained between 340–370° C., preferably 350–360° C.

As described above, because the inner sleeve 38a is cooled to sub-critical temperatures in the super-critical reaction tower 22, super-critical water is converted to sub-critical water on the inside surface of the inner wall of the sleeve. Therefore, it is difficult for salts and the like produced by reactions or contained in the slurry to adhere to the wall surface, or if they are deposited, they are washed away and removed. Also the inner sleeve 38a is cooled by the thermal fluid passage 52 and is maintained at temperatures lower than the critical temperature. As a result, this section can be made of a relatively low cost material, and the service life is also increased.

Furthermore, in the conventional apparatuses, the material for constructing the reaction chamber is exposed to the high reaction temperatures. For this reason, the reaction temperature limit was the temperature allowable of the metal, between 600–650° C. However, in the present apparatus, reaction fields with temperatures higher than the temperature of the reaction chamber wall can be established. Therefore, continuous operation can be carried out at higher temperatures such as 650–800° C., by using the combustion heat of the auxiliary fuel, at higher temperature than the allowable temperature of normal metals.

Sub-critical water passage 52 is difficult to be completely sealed off from the interior because of assembly problems, but as the pressure in the sub-critical water side is higher, there is no danger of the slurry flowing towards the passage 52. Sub-critical water leaks slightly to the slurry side from small clearances of the joint sections, but this water does not contain any oxygen, and since the differential pressure is low, the leaking rate will be also low. From point of view of practical operation, this leak is not a problem.

Also, as the inner sleeve 38a is exposed to severe super-critical water oxidation reactions, there is some possibility in suffering cracking or perforation damages. However, in this case, water leaking from this region does not contain any oxygen, and as it has not passed through the super-critical water heater 136, the reactor temperature decreases.

Therefore, the reaction tends to be neutralized and the situation is shifted to a so-called fail-safe direction. Therefore, there is not the possibility of an uncontrollable reaction and the system can operate very safely.

A portion of circulating sub-critical water exiting from the thermal fluid passage 52 in the super-critical reaction tower 22 is supplied to the super-critical reaction tower 22 through the super-critical water heater 136. The remaining portion of circulating water heats air in the air preheater 138, and the water itself is cooled and passes through thermal fluid passages in sub-critical reaction tower 20 and the second slurry preheater 16 to heat the slurry through inner sleeve 20a, etc. and merges with the make-up water, and returns to the sub-critical water circulation pump 132. It is desirable to adjust the temperature of the returned sub-critical water at 260–320° C., preferably at 270–300° C., by controlling the sub-critical water flow rate to 3–30 times, preferably 5-15 times in relation to the slurry flow.

Air for oxidation reaction is admitted from prescribed locations and is dehumidified, and then is drawn to the high pressure air compressor 152, and the pressure is raised to slightly higher value than the slurry pressure in the slurry pressurizing pump 18. Then the air exchanges heat in the air preheater 138 with sub-critical water exiting from the super-critical reaction tower 22, merges with super-critical water, and is supplied to the super-critical reaction tower 22.

Here, air is used for economy, but pure oxygen vaporized from liquid oxygen by a vaporizer can also be used to design a compact apparatus without the necessity of using the compressor. In this case, since there is no accompanying nitrogen, the amount of exhaust gas is reduced and the concentration of steam in the gas from the flushing tank 100 is raised. Consequently, the thermal efficiency of the first slurry heater and make-up water preheater 144 is improved, and the heat loss by the exhaust gas is reduced. This can facilitate energy savings.

Figure 4A:
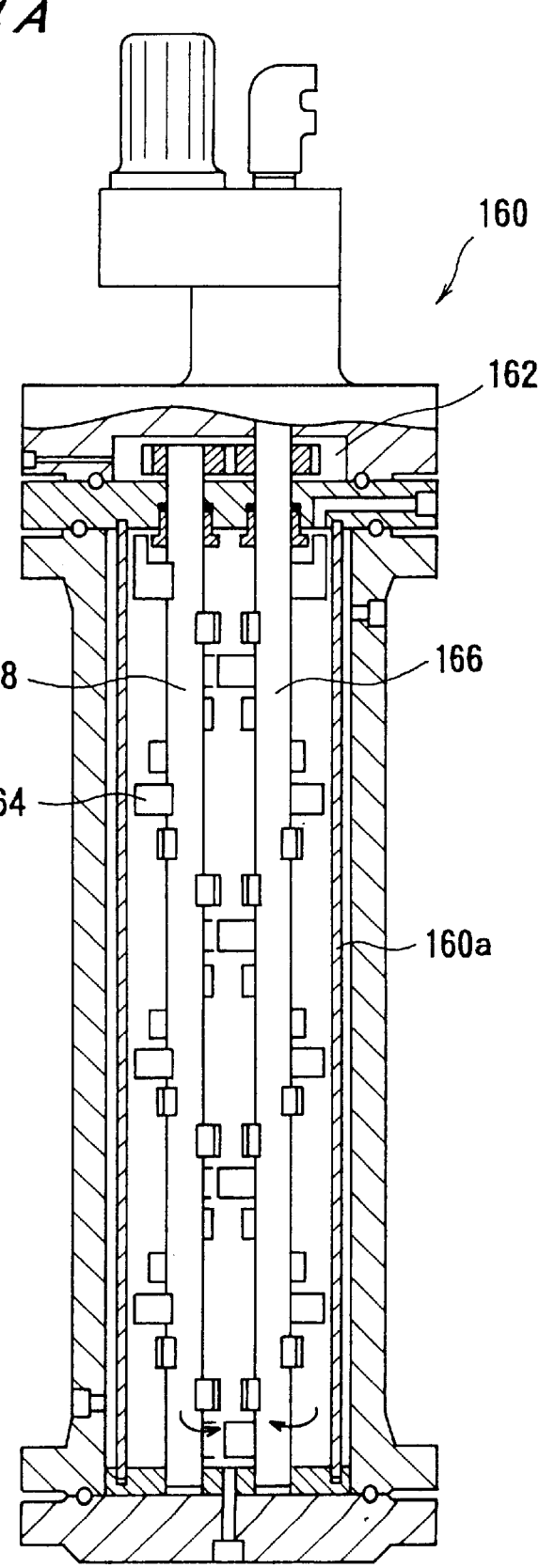
FIG. 4A is a cross sectional view of another embodiment of the sub-critical reaction tower.
Figure 4B:
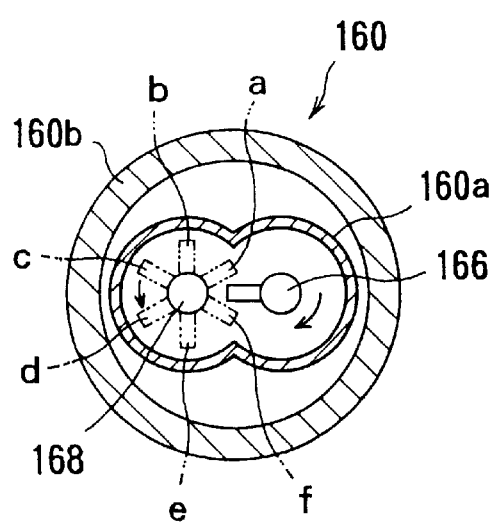
FIG. 4B is a cross sectional view of another embodiment of the sub-critical reaction tower.

FIG. 4A shows another embodiment of the sub-critical reaction tower 160, which comprises a dual axis type heat exchanger. This apparatus is basically the same as the first embodiment, but the water sealing section comprises a gear box 162, and a space of about 10 mm is provided between vertically neighboring stirrer vanes 164, and the stirrer vanes 164 on a drive shaft 166 and a follower shaft 168 are arranged in mirror symmetry, and the gear ratio is chosen so that for six revolutions of the drive shaft 166, the follower shaft 168 revolves seven times. The shape of an inner sleeve 160a, as shown in FIG. 4B, matches the circular traces of the tips of the stirrer vanes 164, which corresponds to two superimposed circles.

Accordingly, the vanes 164 on the follower shaft 168 changes their relative position ⅙ per revolution, and start from position "a" and progress to "b", "c", "d", "e" and "f", and returns to "a". Therefore, the surfaces of the vanes are constantly being cleaned as explained below. Designating the vane surfaces facing the rotation direction as front face, and designating the opposite vane surfaces as back surfaces, the following vane surfaces are in scraping relationship to clean. each other: front faces of the drive shaft 166 side vanes and back faces of the follower shaft 168 side vanes in position "a"; and back faces of the drive shaft 166 side vanes and front faces of the follower shaft 168 side vanes in position "f". Of course, the top and bottom surfaces of the stirrer vanes 164 are cleaned by neighboring vanes 164 for each rotation, and therefore, stirrer vanes 164, shafts 166, 168 are prevented from growing scales, and the apparatus can perform continuous operation.

Figure 5:
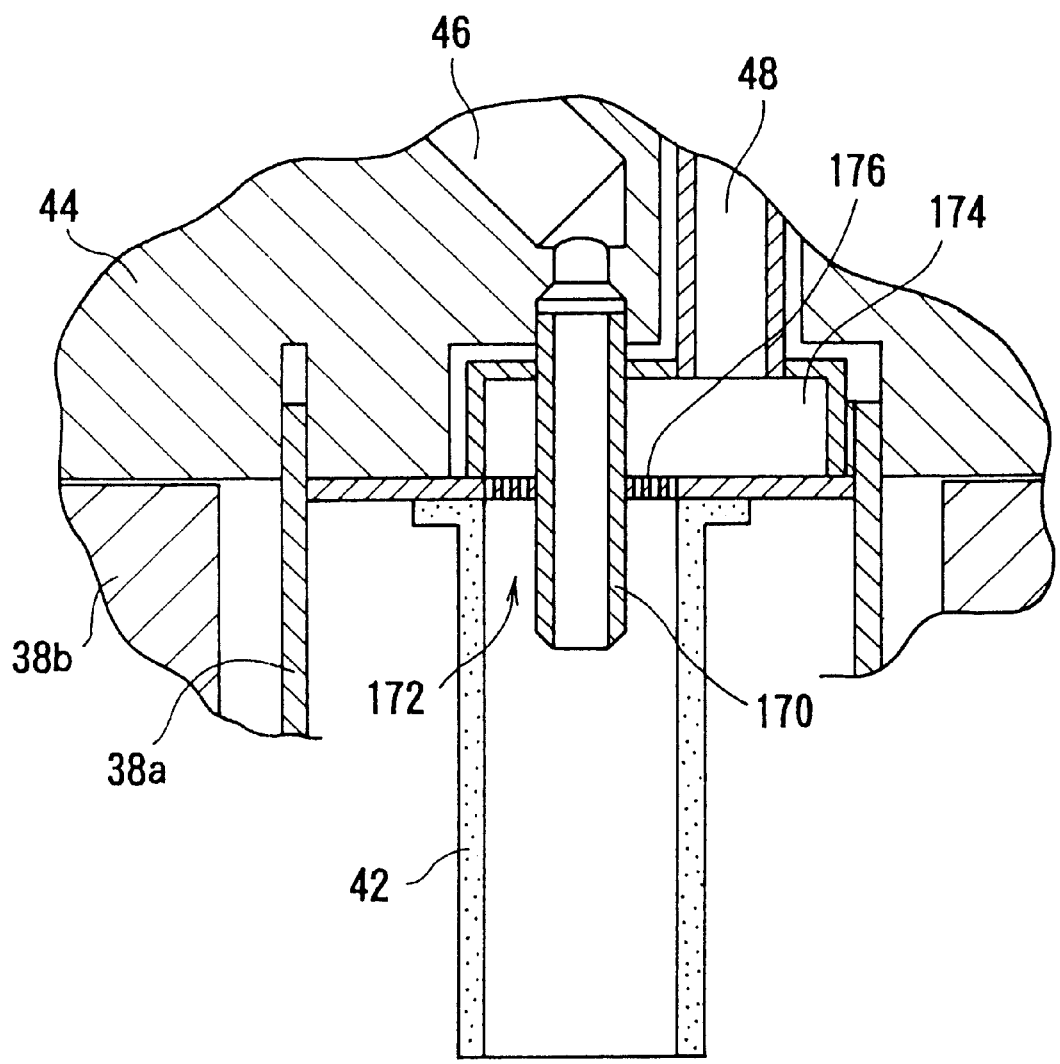
FIG. 5 is a cross sectional view of the top of another embodiment of the super-critical reaction tower.
Figure 6:
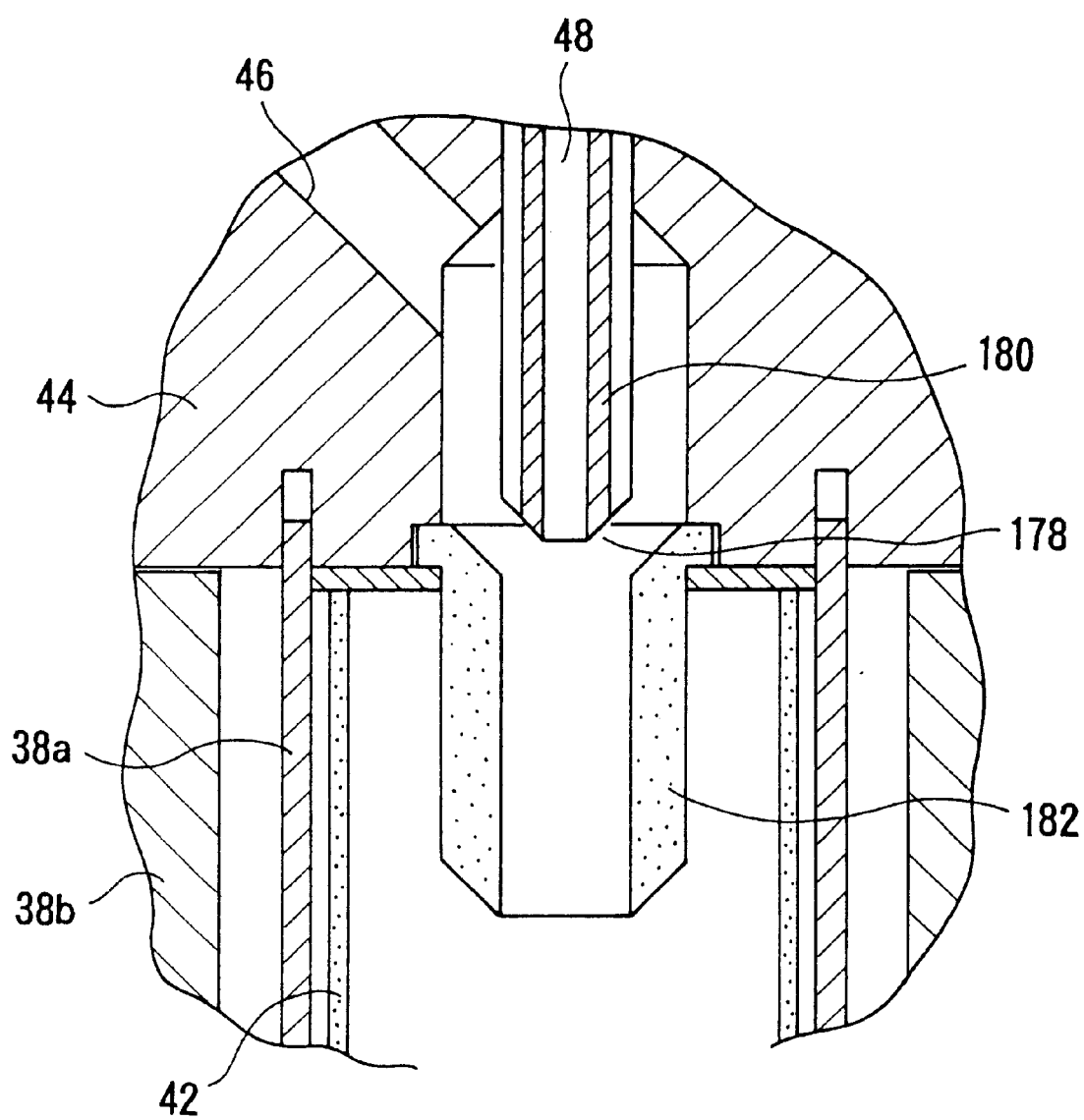
FIG. 6 is a cross sectional view of the top of still another embodiment of the super-critical reaction tower.

In the above described embodiments, the inlet of the super-critical reaction tower 22 comprises the slurry supply nozzle 50 and the super-critical water inlet 48, both of which open on the bottom surface of the lid 44 in transverse directions. FIGS. 5 and 6 show other embodiments regarding to the nozzle construction at the highest section of the super-critical reaction tower 22. The slurry supply nozzle and super-critical water supply nozzle are arranged as a coaxial so-called "two fluid nozzle".

FIG. 5 shows an example of the design best suited when the slurry amount is small in relation to the super-critical water. A slurry supply nozzle 170 is placed inside a super-critical water supply nozzle 172, in which the cross sectional area of the slurry nozzle 170 is small to increasing the fluid velocity and to promoting the mixing of slurry and super-critical water by injecting the slurry into the oxygen containing super-critical water. It is preferable to add the super-critical water in the form that super-critical water surrounds the whole flow of injected slurry, therefore, as shown in the drawing, a dispersion chamber 174 and a porous plate 176 are used to adjust the flow pattern. The temperature is raised by merging the oxygen containing super-critical water with the slurry in consequence of the exothermic oxidation reactions, and this reaction field is surrounded with ceramic flame holding tube 42 that protects from cooling or fluctuation caused by surrounding flows. Accordingly, super-critical conditions can be established reliably by mixing the slurry with super-critical water, thereby enabling a stable operation of the apparatus.

FIG. 6 shows an example, suitable to processing with a small amount of super-critical water relative to the slurry amount. This is a case that mainly uses water soluble fuel such as alcohol to produce the super-critical condition, it becomes difficult to surround the entire periphery of the slurry jet with super-critical water. Therefore, a super-critical water supply nozzle 180 is placed in the center of a slurry supply nozzle 178. In this case, mixing is enhanced by using ceramic chips 182 in the mixing section for mixing the slurry with super-critical water. Super-critical condition is established inside the ceramic chips 182, and the conditions are stable because they are less affected by the fluid flow.

In either case, it is desirable to surround the super-critical water passage with insulation to prevent cooling. A high temperature resistant alloy material such as Incoloy is used to make the super-critical water passage because of a high temperature and highly oxidizing environment.

Figure 7:
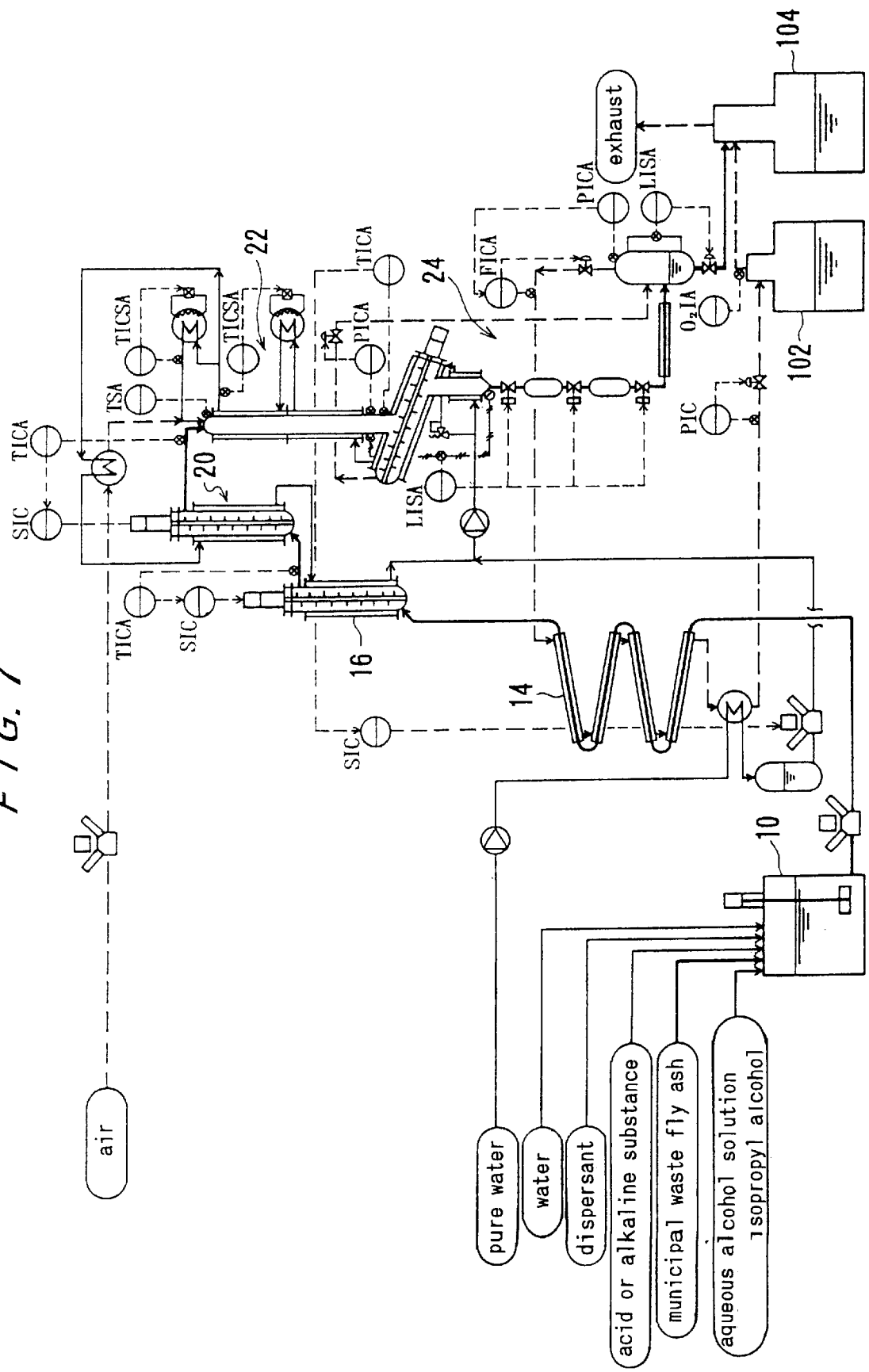
FIG. 7 is a diagram illustrating an embodiment of a control system in the apparatus shown in FIG. 1.

Next, an example of a control method will be presented with reference to FIG. 7. This diagram is essentially the same as that shown in FIG. 1 but has the following control devices.

SIC: speed indicating controller

TICA: temperature. indicating controller unit with alarm

TSA: temperature sequencer with alarm

LISA: level indicating sequencer with alarm

FICA: flow rate indicating controller with alarm $O_2IA$: oxygen concentration indicating unit The aim of this apparatus is to control the unidirectional flow of the mixture phase in the super-critical reaction tower 22, and the reaction products formed in the super-critical zone swept in the unidirectional flow. To obtain such a condition, it is required to control such parameters as temperatures and pressures in the super- or sub-critical zones in the super-critical reaction tower 22.

However, there are many factors influencing those parameters, and their mutual relations are complex.

Therefore, practical control methodology is to control at prescribed value all factors that can be kept constant, and to quantify beforehand, as much as possible, the contributing ratios of each predictable factor to the temperature of the super-critical reaction tower, the main control object, by empirical and experimental approaches under certain operating conditions, so that fluctuations caused by unpredictable factors are handled by varying such predictable factors.

Such predictable factors include: slurry temperature at the entrance in the super-critical reaction tower; slurry supply rate; slurry water content; amount of auxiliary fuel such as isopropyl alcohol, supply air rate, temperature of sub-critical water in the thermal fluid passage, temperature of super-critical water, for example.

Appropriate slurry temperature at the entrance in the super-critical reaction tower 22 is slightly lower than the critical temperature, that is 330–370° C., preferably about 350° C. Slurry temperature at the entrance in the sub-critical reaction tower 20 is aimed at 200–300° C. Therefore, the second slurry preheater 16 or the operation of the sub-critical reaction tower 20 are controlled to achieve those temperatures in the slurry. This control is done by adjusting the rotation of the stirring/scraping shaft in the second slurry preheater 16 or in the sub-critical reaction tower 20 according to pre-selected values. This is because the slurry located near the wall surface of the inner sleeve of these devices cannot be relocated unless forced by stirring, therefore, thermal conductivity between the slurry and critical-water depends on stirring of the slurry in the vicinity of the wall surface. There is no need for expressly controlling the preheated air temperature, because it would not exceed 350–370° C., the temperature of the heat source, i.e., sub-critical water.

Sub-critical water in the thermal fluid passage in the sub-critical reaction tower 22 is controlled by adjusting the output of the sub-critical water heater 134 at an appropriate temperature in the range of 350–370° C., and the temperature of the inner sleeve 38a in the super-critical reaction tower 22 is kept below the critical temperature. Super-critical water heater 136 controls its output for adjusting the temperature of the super-critical water supplied to the super-critical reaction tower 22 as close as possible to 600–650° C. and also as high as possible so long as not damaging the apparatus. In this embodiment, both super- and sub-critical water heaters 134, 136 are electrically operated. However, if the facility is large, a boiler may be used, or if the apparatus is adjacent to an incinerator, thermal source may be obtained from exhaust gas and the running cost can be lowered.

In the super-critical reaction tower 22, the temperature of the slurry at the entrance section of the discharge section 40 in the bottom is controlled to be close to the critical point, by adjusting the amount of make-up water supplied to the sub-critical water circulation loop C, i.e., the rotational speed of the make-up water supply pump 148. If the amount of required make-up water exceeds the maximum capability (discharge rate) of the pump 148, it is necessary to reset the operating parameters such as increasing the concentration of auxiliary fuel, such as isopropyl alcohol.

The pressure of the slurry in the super-critical reaction tower 22 is determined by the amount of the mixture of noncondensable gas and water withdrawn from the highest section of the discharge section 40. The pressure of the slurry and the sub-critical water circulation loop C connected by the super-critical water supply pipe is governed by the pressure loss in the passage until reaching the slurry, therefore, it does not need express control. However, when the super-critical water supply pipe is stopped by a blockage in the super-critical water nozzle 48, or when pressure suddenly dross in the slurry side, the inner sleeves in the super-critical reaction tower 22, sub-critical reaction tower 20 and second slurry preheater 16 may be exposed to a danger of collapsing. To avoid such a situation, a relief valve should be provided that operates when the pressure difference between the sub-critical water circulation loop C and the slurry side exceeds a certain value to release the water in the sub-critical water circulation loop C to the slurry side.

Liquid phase or slurry phase accumulated in the discharge section 40 is withdrawn to the flushing tank 100 when it achieves a given level by operating inlet valve 88—(pressure reducing fore-tank 90)—middle valve 92—(pressure reducing aft-tank 94)—and outlet valve 96 to repeat sequential closing/opening cycles. The liquid level is detected by sensing the pressure difference between the discharge section inlet and the discharge section outlet at the lower end of the discharge pipe 60. Similarly, the flushing tank 100 senses the slurry level or liquid level by the pressure difference between the top and bottom, and, at a certain level, it releases the material to the processed slurry storage tank 104 by opening the drain valve for a certain period.

The gases withdrawn from the flushing tank 100 are used as the heat source in the first slurry preheater 14 and the make-up water preheater 144, therefore, to suppress temperature changes at those heat transfer surfaces, flow rate to the condensed water tank 102 is controlled to be constantly in the range of 3–20 atm, preferably 12–20 atm. On the other hand, the gases flowing into the flushing tank 100 contain a liquid phase, slurry phase, or noncondensable gas from the discharge section 40, and there is a lot of fluctuation. For this reason, a control valve is provided at the outlet of the flushing tank 100 to control the flow of the gas withdrawn from the flushing tank 100 at constant rate. The set value of this flow rate is also adjusted by the internal pressure of the flushing tank. When the internal pressure of the tank increases, the flow rate set value is increased, and conversely when the pressure drops, the flow rate set value is lowered. The slurry system can be operated preferably if the flow rate of the gas withdrawn from the flushing tank does not vary much, even if the internal pressure in the flushing tank varies in a certain range.

Near the highest location 58a of the super-critical reaction tower 22, a temperature detection element is provided to output an alarm when the temperature drops. If the progress of super-critical reaction rate becomes slow with a temperature decrease below 500–550° C., in which uncombusted material may remain in the processed slurry, sequence or interlock procedures should be activated for stopping the feed of slurry. Furthermore, the apparatus according to the present invention is designed to stop supplying the slurry when an emergency situation develops such as an earthquake or fire.

The slurry pressurizing pump 18, the make-up water supply pump 148 and the high pressure compressor 159 used in the apparatus are all operated at high discharge pressures, more than 225.56 atm, and they are diaphragm or piston volumetric types. Therefore, adjustment of discharge amount is generally performed by changing the reduction ratio or rotational speed of the drive motor. When the amount to the sub-critical water circulation loop is increased, temperature variation range in circulation loop is narrowed and, as the maximum temperature is controlled on the basis of the outlet temperature of the super-critical reaction tower 22, it results in raising the temperature of sub-critical water at the outlet of the second slurry preheater 16. If this cannot raise the temperature at the inlet of the super-critical reaction tower 22 to a predetermined temperature, some improvement may be achieved by increasing the output rate of the sub-critical water circulation pump 132.

The amount of air or oxygen is adjusted with some excess in relation to the required oxidizer calculated from the amount of supplied aqueous organic substance, such as alcohol or isopropyl alcohol, which is the majority of combustible matter in the slurry. But, indeed, fly ash produced from municipal waste sometimes contains unburned carbon. To handle this, it is also permissible to control the amount of air or oxygen by continually monitoring the remaining oxygen content in the noncondensable gases withdrawn from the condensed water tank.

Figure 8:
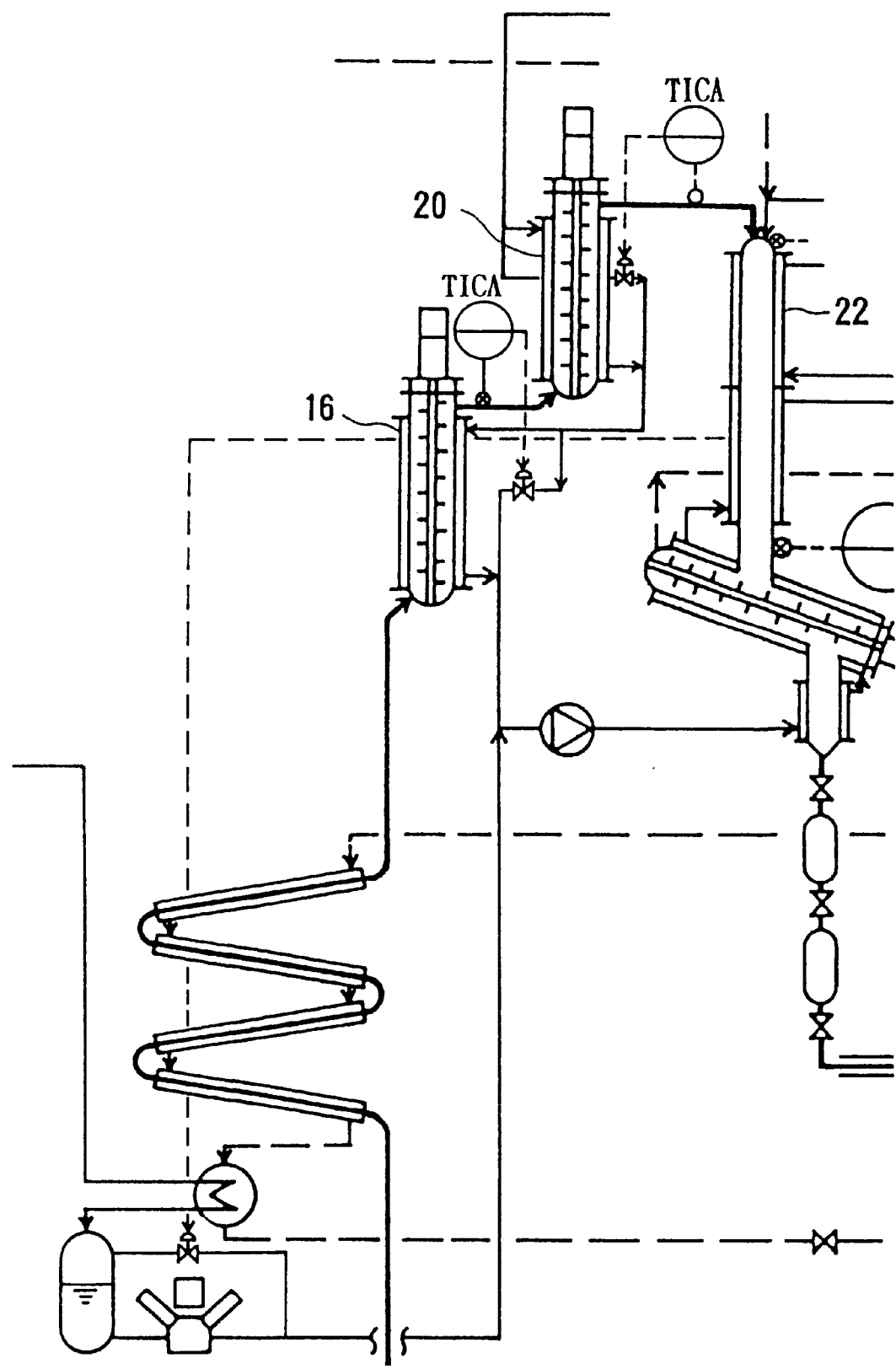
FIG. 8 is a diagram of another embodiment of the control system.

If the slurry exhibits the tendency to separate solid particles or if the temperature difference within the vessel is not desirable, it is necessary to operate the stirrer vanes 112 to some extent in the second slurry preheater 16 and in the sub-critical reaction tower 20, so that control temperature variation range at the outlet becomes limited. Therefore, another effective way to control temperature is to bypass the sub-critical water which acts as the heat source. In such a case, control by varying the rotational speed of the stirrer vanes 112 may be combined. However, as shown in FIG. 8, it is preferable to operate the stirrer vanes 112 at a constant speed desirable for the slurry, and simply adjust the opening of the bypass valve to control the flow rate of the sub-critical water, because a lower number of controlled parameters are desirable.

Adjusting the discharge rate from the make-up water supply pump 148 can be achieved by varying the rotational speed or speed reduction ratio of the motor to control the temperature at the outlet of the super-critical reaction tower 22. In this case, as the rotational speed is lowered, output power from the motor will be lowered, which may limit the range of possible speed reduction. This also may not allow for a rapid change in speed. Even in such a case, it is possible to adjust the rate in the return line to the degassing vessel 146 by adjusting the valve opening.

In this invention, prevention of adhesion and removal of adhered matters on the inner sleeve 38a of the super-critical reaction tower 22 is carried out by washing with sub-critical water generated by cooling on the inner sleeve surface, therefore, if salts and particles are present in excessive amounts in the slurry, the amount of generated sub-critical water is insufficient and there is possibility of adhered matter growing into scales to block the reaction tower. Therefore, the slurry concentration should be generally held lower than 10–30%. The allowable slurry concentration can be increased by lowering the temperature of sub-critical water for cooling the wall of the super-critical reaction tower, which increases the amount of sub-critical water generated on the inner wall surface of the super-critical reaction tower.

In the upper region in the reaction tower 22, the amount of sub-critical water flowing down is smaller than the lower region, but the amount of salts and powder that stick to the wall surface is low compared with the amount of condensed sub-critical water, so that concentration is much less than the average concentration within the reaction tower. Blocking in the lower section of the reaction tower 22 also does not occur. This is because, the entire mass reverts to a slurry state as it approaches the lower section of the reaction tower 22, and the concentration approaches the average, but the amount of sub-critical water falling from the upper section also increases, thus, the entire mass attains more fluidity.

One method of enhancing the downward flow of sub-critical water containing salts and solid particles is to impart vertical vibration to the apparatus, especially to the inner sleeve. By doing so, even a higher slurry concentration can be processed, and the sub-critical liquid phase or slurry phase on the inner sleeve can be reliably discharged downward. This method is also applicable to the material in the slurry discharge section connected to the bottom of the super-critical reaction tower, and it is possible to eliminate slurry transport screws with application of vertical vibration.

Figure 10:
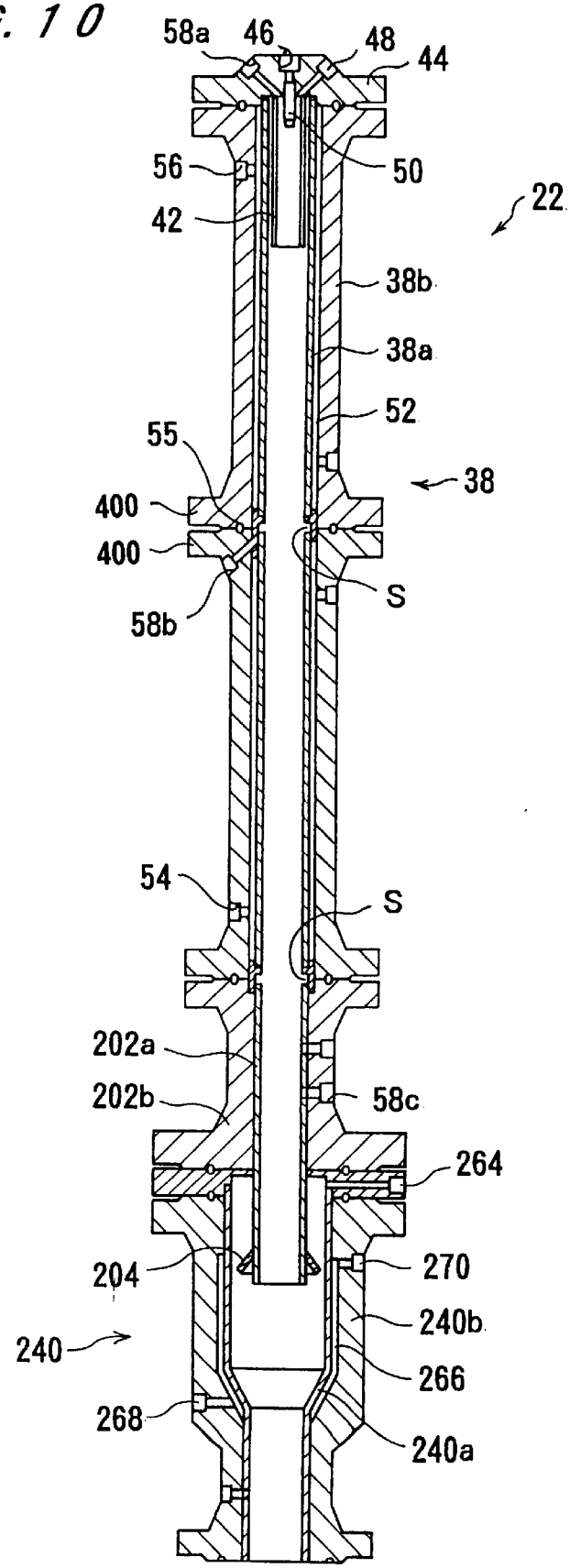
FIG. 10 is a cross sectional view of another embodiment of the discharge section in the super-critical reaction tower.

FIG. 10 shows another embodiment of the super-critical reaction tower 22. In this case, a slurry discharge section 240 of vertical cylinder shape is attached, through a joint portion 202a, to the bottom end of the tower structure 38. In other words, this apparatus does not have transport screws in the slurry discharge section 240, thereby simplifying the apparatus construction and providing lower capital cost and allowing for a narrower construction space.

The slurry discharge section 240 is also of a double-walled cylinder type, and near to the top end, a gas outlet 264 is provided to release the gas phase containing noncondensable gases such as oxygen, nitrogen and carbon dioxide so as to maintain the interior pressure constant. The space between an inner sleeve 240a and an outer sleeve 240b is also a thermal fluid passage 266 for flowing sub-critical water, and sub-critical water supplied from an bottom inlet 268 is discharged from an upper outlet 270.

In this embodiment, to secure a slurry suspension function, a constriction section having a taper at specific angle is provided in the mid-stage, but a straight shape is also acceptable. The inner sleeve 202a at the lower section of the tower structure 38 extends into the discharge section 240 and is surrounded by annular protrusions 204 in a shape of an umbrella. The purpose of this arrangement is to accelerate the ascending gases generated from the slurry in the lower region to flow along the wall surface so as to remove mist and slurry droplets included in the exhaust gases, thereby preventing such substances to flow out from the gas outlet 264.

In the above embodiments, a super-critical zone and a sub-critical zone are formed in the super-critical reaction tower, and oxidation reactions are carried out in the super-critical zone. However, reactions other than the oxidation reaction can also be carried out in the super-critical zone. When, depending on the type of reactions, it is not necessary to generate the super-critical state, the apparatus may be used to form the sub-critical zone only.

As explained above, this apparatus enables processing of waste matter at lower temperatures compared with cases of withdrawing the slurry as in critical conditions, so that the post-treatments are significantly simplified, and since residual substances of low fluidity containing salts are not formed in the reaction chamber, post-treatments are also simplified. Furthermore, the process is carried out in one direction, there is no need for a complex arrangement for circulating the mixture phase in the reaction chamber, thereby resulting in producing superior effects that the apparatus and its operating procedure are significantly simplified.

INDUSTRIAL APPLICABILITY

This invention is useful for processing matter such as: ashes produced when municipal waste are incinerated; herbicides, PCB, DDT and other pesticides; chemical weapons such as poison gas; explosives; substances with high organic contents unamenable to biological processing; waste water containing matters unamenable to biological processing and compounds that suppresses biological metabolic reactions; and other substances that cannot be discharged or left in the environment.

What is claimed is:

1. A super-critical reaction apparatus for processing a mixture phase, the mixture phase comprising an object matter to be processed and a medium in liquid form, by subjecting the mixture phase to a super-critical state of the medium, said super-critical reaction apparatus comprising:
   a reaction chamber of vertical cylindrical shape, said reaction chamber having an upper end, a lower end, and an interior section;
   a feed supply inlet located at said upper end of said reaction chamber, said feed supply inlet being operable to supply the mixture phase to said reaction chamber;
   a product outlet located at said lower end of said reaction chamber, said product outlet being operable to output the object matter and reaction products,
   wherein said reaction chamber comprises a double-walled cylinder having an inner sleeve and an outer sleeve,
   an inside of said inner sleeve comprises a super-critical zone above and a sub-critical zone below, and wherein the object matter and the reaction products are progressed towards said lower end; and
   a thermal fluid passage provided in a space between said inner sleeve and said outer sleeve.

2. A super-critical reaction apparatus according to claim 1, wherein said reaction chamber has an operational length that is not less than four times a diameter of said reaction chamber.

3. A super-critical reaction apparatus according to claim 1, wherein said double-walled cylinder forms said thermal fluid passage, said thermal fluid passage surrounding at least one of the super-critical zone and the sub-critical zone.

4. A super-critical reaction apparatus according to claim 1, wherein said feed supply inlet comprises:
   a slurry supply nozzle being operable to supply a slurry or a liquid containing the object matter; and
   a medium supply inlet being operable to supply the medium at a temperature exceeding a critical temperature of the medium.

5. A super-critical reaction apparatus according to claim 1, wherein the super-critical zone is provided with a tube structure, said tube structure for forming a localized continuous reaction field within the super-critical zone, and said tube structure having one end opened at said feed supply inlet and another end opened downstream.

6. A super-critical reaction apparatus according to claim 1, further comprising a tubular discharge section located at a lower section of said discharge tube, said tubular discharge section being disposed transversely to the sub-critical zone.

7. A super-critical reaction apparatus according to claim 6, wherein said tubular discharge section is disposed at an angle to a plane normal to said reaction chamber, said tubular discharge section having a gas outlet provided in its upper end.

8. A super-critical reaction apparatus according to claim 6, further comprising a transport device at said tubular discharge section, said transport device being operable to move a slurry phase.

9. A super-critical reaction apparatus according to claim 8, wherein said transport device comprises transport screws.

10. A super-critical reaction apparatus according to claim 9, wherein each of said transport screws comprises vanes disposed discontinuously about a shaft.

11. A super-critical reaction apparatus according to claim 8, further comprising:
    a drive source;
    a fluid sealing mechanism; and
    a coupling section connecting said drive source to said transport device through said fluid sealing mechanism.

12. A super-critical reaction apparatus according to claim 1, wherein the medium at a temperature less than a critical temperature of the medium serves as a thermal fluid in said thermal fluid passage.

13. A super-critical reaction apparatus according to claim 12, further comprising a heating passage operable to withdraw a part of the medium to be supplied to said thermal fluid passage, to heat the part of the medium to a temperature higher than the critical temperature of the medium, and to deliver the part of the medium to said feed supply inlet of said reaction chamber.

14. A super-critical reaction apparatus according to claim 1, further comprising at least one of a scraping device being operable to scrape at least one of objects adhering to, and objects growing on an internal wall surface of the sub-critical zone in said reaction chamber; and a stirring device being operable to stir the mixture phase.

15. A super-critical reaction apparatus according to claim 1, further comprising a pre-treatment vessel being operable to pre-process the object matter to be sent to said reaction chamber at a sub-critical temperature of the medium.

16. A super-critical reaction apparatus according to claim 16, wherein said pre-treatment vessel is provided with an outlet for discharging the object matter at substantially a same height as said feed supply inlet of said reaction chamber.

17. A super-critical reaction apparatus according to claim 1, further comprising:
    a cooling device located downstream of said reaction chamber, said cooling device being operable to further cool the object matter; and
    a separation tank being operable to separate at least one of vapor and liquid from cooled object matter by subjecting the object matter to a reduced pressure.

18. A super-critical reaction apparatus according to claim 17, further comprising a pressure reducing device provided between said reaction chamber and said cooling device.

19. A super-critical reaction apparatus according to claim 18, wherein said pressure reducing device comprises at least two pressure reducing tanks separated by a middle valve, wherein after a first tank is filled with the object matter, said middle valve is opened and the object matter expands into a second tank to reduce a pressure of the object matter.

20. A super-critical reaction apparatus according to claim 17, further comprising a preheating pipe being operable to preheat the object matter with a gas phase produced in said separation tank.

* * * * *